United States Patent Office 2,854,661
Patented Sept. 30, 1958

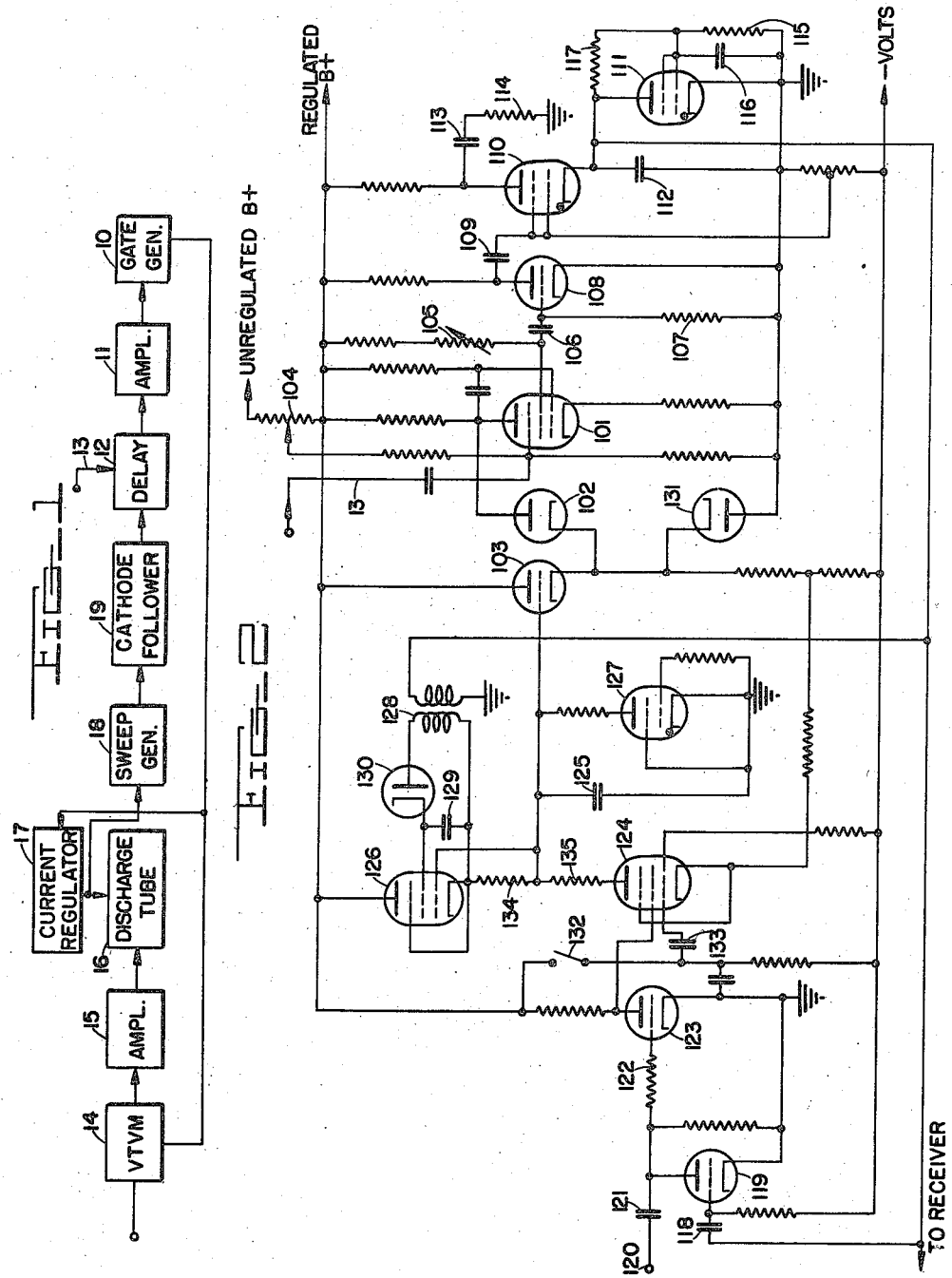
Sept. 30, 1958  R. A. EMMETT, JR  2,854,661
AUTOMATIC RANGE TRACKING SYSTEM
Filed Feb. 21, 1946
INVENTOR.
ROBERT A. EMMETT JR.

2,854,661

AUTOMATIC RANGE TRACKING SYSTEM

Robert A. Emmett, Jr., Washington, D. C.

Application February 21, 1946, Serial No. 649,437

4 Claims. (Cl. 343—7.3)

(Granted under Title 35, U. S. Code (1952), sec. 266)

The present invention relates in general to automatic range tracking circuits, and more particularly to electronic means adapted to be associated with radar or pulse radio communication devices for automatically searching, gating and following in range a desired repetitive pulse signal.

In many applications of radio transmitting and receiving systems, particularly those in which the signals are of the pulse type recurring at a selected repetition frequency, it is often desirable to provide means for selecting a designated pulse signal and rejecting all other received signals, such as spurious responses, random noise and reflected signals. This selection of a particular signal in the receiver output is usually accomplished by electronically gating the received signals with relation to a given time reference. With such systems, it has heretofore been necessary to provide additional manually controllable means for positioning the gating waveform near or in coincidence with the designated signal when initially setting the system into operation to enable the gate to lock on the designated signal. Such systems have also been provided with automatic tracking means to maintain the gating waveform in positive coincidence with the designated signal should the time of occurrence of the signal relative to that of the time reference be varied, to enable such systems to operate with radar, aircraft homing, and blind landing devices and the like in which the time occurrence of a repetitive pulse signal is normally varied relative to a designated recurring reference time in accordance with range variations of a target. An example of such a system will be found in co-pending application 629,688, filed Nov. 19, 1945 by T. Robert Burnight and Robert A. Emmett, Jr. entitled "Blind Landing System."

Accordingly, it is an object of this invention to provide means responsive to certain input signals to select one signal from a plurality of input signals and gate the selected signal in time.

Another object of this invention is to provide means responsive to certain input signals to select one signal from a plurality of input signals and gate and track in range the selected signal.

Another object of the invention is to provide means associated with a radio receiver for selecting one signal from a plurality of signals in the receiver and rendering said receiver responsive only to such selected signal.

Another object of the invention is to provide means associated with a radio receiver for recurring pulse signals for selecting and gating one signal in the receiver output and rejecting all other signals present.

Another object of the invention is to provide means associated with a radio receiver employed in variable range, pulse reception for gating and tracking in range one signal pulse in the receiver output and rejecting all other signals present.

Another object of the invention is to provide means associated with a radio receiver employed in variable range-pulse reception for searching a complete repetition cycle for a designated signal and selecting and gating the signal in range to exclude all other signals from the receiver output.

Other objects, advantages and capabilities of the invention will become apparent with the following description taken in conjunction with the accompanying drawing, showing only a preferred embodiment of the invention, in which:

Figure 1 is a block diagram of the automatic tracking unit forming the present invention;

Figure 2 is a schematic diagram of the automatic tracking circuit.

The tracking system will operate with any signal source or combination of signal sources providing two distinct signal outputs having the following characteristics. One of the signals must be a series of timing or synchronizing pulses coupled into the delay and gate generating circuits to establish the repetition frequency of the range gate generated in the tracking system. The other signal is coupled into the gated sensing channel of the tracking system to generate range error signals for the gate. This input signal must be made up of recurring multiple pulses having the same repetition frequency as the timing pulses determining the repetition frequency of the gate generating circuit. These signal pulses must likewise bear a time phase or delay relationship with respect to the time occurrence of the timing pulses which remains constant or progressively increases or decreases, whereby the recurring gate generated in the tracking system may continuously follow the delay variations of the signal pulses. The tracking system is designed to discriminate against noise, random delay and random repetition frequency pulse signals and consequently will follow only signals having smooth delay variations.

Referring now to Figure 1, showing a block diagram of the automatic tracking system, a narrow gating pulse of about three microseconds duration is generated in gate generator 10. This gate generator 10 is triggered by a triggering pulse coupled through an amplifier stage 11 and generated by a delay circuit 12, such as a phantastron circuit (for circuit details of a phantastron circuit see the circuit in Figure 2 in which tube 101 is a part), which, when triggered by a reference pulse coupled into the delay circuit by lead 13, generates a pulse of variable width, the width being controlled by a direct current voltage. The trailing edge of this phantastron pulse is used to trigger the gate generator 10. The pulse repetition rate of the delay circuit 12 and the gate generator 10 is determined by the frequency of the recurring reference signals coupled through lead 13.

The recurring signal pulses from the receiver with which this device is associated are coupled into a vacuum tube voltmeter 14 gated in range by the output waveform of gate generator 10. The pulse repetition frequency of the input triggering signal to the delay circuit 12 must be equal to that of the pulse signals fed into voltmeter circuit 14. This voltmeter circuit is similar to a normal shunt diode circuit except that a triode is used so that the tube may be turned on and off by the gate. The advantage of using this type of circuit is that no voltage output is developed unless the signal and gate fed thereto coincide. The voltmeter circuit output is coupled through an amplifier 15 to discharge tube 16 to vary the conduction point and the apparent series plate resistance of the discharge tube 16 to a current regulator stage 17. A sweep generator 18 is coupled in series with the current regulator stage 17 to effect a constant charging current and is self-triggered to generate a linear sawtooth voltage of low frequency compared to that of the reference trigger pulses coupled through lead 13.

On energizing the automatic tracking system, the sawtooth voltage waveform generated in sweep generator 18 is coupled through a D. C. amplifier 19 to the delay phantastron 12, thus linearly varying the direct circuit control voltage imposed upon the delay circuit and progressively increasing, from a very short duration initially, the duration of the pulse generated by phantastron 12 and thus the delay or range of the gating pulse produced by gate generator 10. Until the gate and pulse signal come into range or time coincidence, there can be no voltage output from voltmeter circuit 14 and thus tube 16 remains non-conducting and the range delay of the gating pulse is progressively increased. When, however, the signal and gate are brought into coincidence in voltmeter 14, a negative voltage proportional to their combined amplitudes is generated, this voltage being effectively inverted by amplifier 15 to bring the discharge tube 16 into conduction, thereby bleeding off part of the charging current supplied through current regulator stage 17 to the sweep generator 18 to reduce the slope of the sawtooth voltage to zero or carry it negative. The discharge tube 16 and voltmeter 14 are so adjusted that the voltage output of the sweep generator 18, when the gate and pulse signal reach coincidence, controls the delay of the gate generated by phantastron 12 to maintain the signal and gate in positive coincidence. This same gating pulse, controlled in time by the condition of coincidence or non-coincidence as sensed by the tracking unit, may be coupled out to the intermediate frequency or video stages of the receiver to bias these stages below cut off during the absence of the gate and thus maintain the receiver responsive only to the gated signal.

Referring now to Fig. 2 showing the schematic diagram of the specific circuits by which the various above mentioned functions are accomplished, a series of cycle initiating reference pulses, obtained from any conventional external source and controlling or synchronized with the recurrent frequency of the cycles of operation of the transmitting and receiving system with which the automatic tracking unit is associated, are coupled through connecting lead 13 to the suppressor grid of tube 101, which is a pentode designed for phantastron operation. This initiating pulse triggers the phantastron 101, driving its plate suddenly to a less positive potential. From this initial voltage level, the plate drifts gradually in a negative direction, fairly linearly, according to the constants of the parameters in the plate and grid circuits from a voltage level which is determined by the voltage on the plate of diode 102, coupled to the plate of the phantastron 101, to a lower level determined by the tube constants, at which level the phantastron is self-triggered back to its initial condition. The initial voltage on the plate of diode 102 is limited by the voltage on the cathode of cathode follower triode 103 to which the cathode of diode 102 is connected. A somewhat steeper-sided pulse than that at the plate of the phantastron 101 is obtained on the screen grid of that tube. The potentiometer 104, coupled between the regulated and unregulated D. C. plate voltage sources and having a variable arm from which the bias voltage on the suppressor grid of tube 101 is obtained, and the potentiometer 105 in the screen grid circuit of phantastron 101 are provided to effect manually controllable compensation for variations in heater current and tube characteristics due to ageing of the tube, whereby the triggering and delay characteristics of the phantastron stage may be maintained at a constant operating proportionality with the control volage on the cathode of diode 102.

The positive pulse generated at the screen grid of the phantastron tube 101 is coupled through a short time constant RC peaker input circuit formed by condenser 106 and resistor 107 to the grid of triode 108. The peaker circuit modifies the phantastron pulse wave-form to generate on the grid of triode 108 a very short duration positive pulse in time coincidence with the leading edge of the phantastron pulse and a negative pulse coincident with the trailing edge of the phantastron pulse. Since the triode 108 is normally operated near plate current saturation, the output of the amplifier 108 yields a very low amplitude negative pulse coincident with the input positive pulse and a high amplitude positive pulse coincident with the input negative pulse.

This output is coupled through condenser 109 to both grids of tetrode thyratron tube 110 forming, with tetrode thyratron 111, the gate generator 10. The input tube 110 is provided with a condenser 112 coupled between its cathode and ground and a condenser 113 and damping resistor 114 coupled between its plate and ground to effect control of the firing of thyratron 110. Both grids of thyratron 111 are coupled to ground through resistor 115 and condenser 116, which, together with resistor 117 coupled between the grids and plate of tube 111, constitute the charge path for condenser 112. Thus, with both thyratrons 110 and 111 in a normally non-conducting condition, the delayed positive pulse coupled to the grids of thyratron 110 carries the tube 110 into conduction with a large flow of current, rapidly charging up condenser 112 and condenser 116 through resistors 115 and 117, thus placing a positive voltage on the plate of thyratron 111 and partially discharging condenser 113. Thus, when the voltage on the grids of thyratron 111, due to the charging of condenser 116, reaches a given value determined by the time constant of the charging circuit of condenser 116, the thyratron 111 will be carried into conduction, rapidly discharging condenser 112 and 113 and carrying the cathode and plate of thyratron 110 to approximately ground level, thereby cutting off the conduction through the tube. Due to the high conduction currents carried by the thyratrons, a steep-sided positive pulse suitable for gating purposes may be tapped off of the cathode of tube 110.

The gate, adjusted in practice for a duration of about three microseconds, is coupled from the cathode of thyratron 110 through coupling condenser 118 to the grid of triode 119 forming the vacuum tube voltmeter 14 (Fig. 1) to gate the voltmeter tube 119 in range. The video output of the pulse receiver (not shown) with which the automatic tracking unit is associated is coupled from input terminal 120 through condenser 121 to the plate of the voltmeter tube 119. The plate of voltmeter tube 119 is coupled through grid limiting and filtering resistor 122 to the grid of an amplifier triode 123. In operation, when the pulse signal and the gate do not coincide in voltmeter tube 119, the plate of 119 is approximately at ground level, causing the amplifier 123 to conduct quite heavily. The plate of amplifier 123 is coupled directly to the screen grid of pentode discharge tube 124, the bias voltage on which is adjusted to such a value that the discharge tube 124 is held cut off by the voltage on its screen grid when the amplifier 123 is conducting. When the gate and signal pulse coincide in voltmeter tube 119, the plate of tube 119 is driven negative due to the charge taken up by condenser 121. This negative going action is passed rapidly to the grid of amplifier 123, driving the tube 123 to a condition approaching cut off, thus reducing the voltage drop in the plate circuit resistor and driving the plate of tube 123 and the screen grid of pentode 124 positive, resulting in conduction through pentode 124. The output voltage of voltmeter 119 is a direct current voltage with superimposed alternating current variations. The A. C. variations are somewhat filtered by the D. C. filter circuit formed by resister 122 and the interelectrode capacitance of tube 123. The A. C. variations have a tendency to effect a faster and more sensitive response of the system to the state of coincidence of the signal pulse and the gate. The A. C. component sets up continuous voltage variations on the control grid of discharge tube 124, and thus continuous variation of the charging current supplied to sweep condenser 125, to effect small continuous variations in the range of the gate and the voltage output of voltmeter 119 to establish the voltage level of the upper plate of condenser 125 quickly and accurately. The amplitude of this A. C. component is kept low due to the filtering action of the grid input circuit of amplifier 123.

A sweep voltage for varying the duration of the pulse generated by phantastron 101 and thus the range or time delay of the gate is generated by a self-triggered linear sweep generator associated with the discharge tube 124. This sweep voltage is generated by the linear charging of sweep condenser 125, through a pentode or constant current tube 126 in the charging path of condenser 125. A thyratron 127 is placed across the condenser 125 and is so adjusted to trigger itself and discharge the condenser 125 when the voltage across the condenser 125 reaches a given level, in practice approximately the plate supply voltage level. The gating waveform taken from the cathode of thyratron 110 in the gate generator is also coupled through a transformer 128, the secondary of which is coupled across a condenser 129 between the screen grid and the cathode of pentode 126, and rectified by diode 130 in the secondary of the transformer 128 to maintain the constant current characteristics of the pentode 126.

The sweep voltage, having a period whose length is many times that of the reference pulse wave form coupled through the lead 13, is coupled directly from the ungrounded upper plate of the sweep condenser 125 to the grid of cathode follower triode 103, thereby establishing the voltage level on the cathode of diode 102, the amplitude of the instantaneous voltage drop at the plate of phantastron 101 when triggered by the cycle initiating pulse, and thus the duration of the phantastron pulse.

The diode 131 coupled between the cathode of cathode follower triode 103 and ground is provided to prevent the voltage level at the cathode of triode 103 from going below ground level when the thyratron 127 discharges sweep condenser 125 and thereby delay the start of the next sweep.

Carrying the discharge tube 124 into conduction by applying a positive voltage to its screen grid diverts through the discharge tube a portion of the charging current flowing from pentode 126 and proportionally reduces the rate of charge of sweep condenser 125 and the slope of the sweep voltage. The parameters of the control circuits are so adjusted as to maintain the voltage at the upper plate of the sweep condenser 125 exactly constant and at the proper level to establish the range of the gate exactly equal to that of the signal pulse when the signal and gate once coincide in voltmeter 119. This gate may also be coupled to the intermediate frequency or video stages of the receiver to gate the receiver in time or range and thus render the receiver non-responsive to any signals not coincident with the gate.

A summary of operation of the invention is as follows: On energizing the automatic tracking device, the sweep generator immediately begins creating the sweep voltage by linearly charging the condenser 125 from an initial voltage of approximately ground level toward the plate supply voltage level at a time constant determined by the plate resistance of constant current pentode 126 and its cathode resistor, continuing this linear rise until the condenser 125 is discharged by the firing of thyratron 127. This sweep voltage applied through amplifier 103 and diode 102 to the phantastron 101, progressively increases the length of each phantastron pulse initiated by the reference pulses until the gate, generated by the triggering of the double thyratron gate generator with the trailing edge of the phatastron pulse, is brought into range or time coincidence with the signal pulse. When the signal and gate coincide in voltmeter 119, the negative voltage developed at the plate of the voltmeter tube 119 drives amplifier 123 near cut off, thus increasing the positive voltage on the screen grid of discharge tube 124 and carrying that tube into conduction. Discharge tube 124 is so adjusted as to conduct approximately the same amount of current as constant current tube 126, discharging condenser 125 and causing the sweep voltage waveform fed to amplifier 103 to assume a negative slope, thereby reversing the gate's direction of travel, i. e. progressively reducing the range of the gate. If the sweep condenser 125 discharges too rapidly, the gate will be thrown out of coincidence with the signal pulse, returning the plate of voltmeter 119 to ground voltage level and cutting off discharge tube 124 again to resume charging of the condenser 125 until the gate and signal are returned to coincidence. Hence, the circuit is self adjusting to maintain the gate coincident with the leading edge of the signal pulse.

A switch 132 is coupled between condenser 133, connected to the control grid of discharge pentode 124, and the plate voltage supply and is adapted to be energized momentarily to generate a low amplitude pulse followed by a high amplitude negative pulse to cut off the discharge tube 124 momentarily, thus throwing the signal and gate out of coincidence and permitting the sweep generator to search in increasing range out to the next signal.

If it is desired to adapt the system to search a given range segment and select a predesignated pulse signal from a plurality of pulse signals within the range segment, means such as pulse width, amplitude or amplitude modulation discriminator may be associated with the gated vacuum tube voltmeter stage to render the stage responsive only to signals having predesignated width, amplitude or modulation characteristics.

If a meter indication of the range or time position of the gate relative to the reference pulse is desired, the voltage at the cathode of cathode follower tube 103 is continuously proportional to the range when the gate is coincident with the signal pulse. Thus, an ammeter calibrated in range and connected between the cathode of tube 103 and a manually controllable positive D. C. voltage for zero setting will provide the desirable range information.

The velocity of the signal pulse, i. e. its change in range per unit time, may be determined by comparing the current in the cathode resistor 134 of constant current tube 126 with the current in the plate circuit resistor 135 of discharge tube 124. Since the velocity of the gate is directly proportional to the charging current from the junction of resistor 134 and 135 to condenser 125 when the signal and gate are in range coincidence, a differential current indicator calibrated in velocity and coupled to the resistors 134 and 135 may be provided to measure the difference in the magnitude of the two currents. For example, if the current through pentode 126 is held constant, a ratio meter coupled to the resistors 134 and 135 to measure the ratio of the current through resistor 135 to that through resistor 134, when calibrated to compensate for the constant of proportionality, will give an accurate indication of the velocity of the gate. Also a voltmeter coupled between the screen grid of pentode 124 and ground and calibrated in range velocity may be employed since the variations in the D. C. voltage level of the plate of amplifier 123 are proportional to the velocity of the gate.

Various modifications may be made in the invention without departing from the spirit and scope thereof and it is desired, therefore, that only such limitations shall be placed thereon as are imposed by the prior art and are set forth in the appended claims.

The invention described herein may be manufactured and used by or for the Government of the United States of America for governmental purposes without the payment of any royalties thereon or therefor.

What is claimed is:

1. In an automatic signal pulse tracking system which includes a range gate pulse generator, operative in response to the trailing edge of a variable width pulse to produce a gating pulse for following an incoming signal pulse, and a variable width pulse generator for producing a pulse whose width is proportional to the magnitude of a continuously variable amplitude control voltage, a circuit for generating said control voltage comprising a coincidence circuit means for delivering a first voltage when said range gate pulse and said signal pulse coincide, means for coupling said signal pulse and said range gate pulse to said coincidence circuit, a condenser, a series connected charging circuit for said condenser including a constant current path and a source of direct current voltage, a discharge means coupled across said condenser for discharging the same when the voltage across said condenser reaches a predetermined value, a vacuum tube electron discharge device having at least cathode, control, and plate electrodes, the anode and cathode electrodes connected in parallel circuit relation to said condenser and in series circuit relation to said constant current path, said coincident circuit means coupled to said vacuum tube control electrode whereby said condenser begins to discharge upon coincidence of said range gate pulse and said signal pulse, and means connected to said charging circuit for coupling the voltage developed therein to the variable width pulse generator.

2. In an automatic signal pulse tracking system which includes a range gate pulse generator operative in response to the trailing edge of a variable width pulse to produce a gating pulse for following an incoming signal pulse, and a variable width pulse generator for producing a pulse whose width is proportional to the magnitude of a continuously variable amplitude control voltage, a circuit for generating said control voltage comprising a coincidence circuit means for delivering a first voltage only when said range gate pulse and said signal pulse coincide, means for coupling said signal pulse and said range gate pulse to said coincidence circuit, a condenser, a series connected charging circuit for said condenser including a constant current device and a source of direct current voltage, a gaseous discharge device means having anode and cathode electrodes coupled across said condenser for discharging same when the voltage across said condenser reaches the breakdown potential of said discharge device, a vacuum tube electron discharge device having at least cathode, control, and plate electrodes, the anode and cathode electrodes connected in parallel circuit relation to said condenser and in series circuit relation to said constant current device, said coincident circuit means coupled to said vacuum tube control electrode whereby said condenser begins to discharge upon coincidence of said range gate pulse and said signal pulse, and means connected to said charging circuit for coupling the voltage developed therein to the variable width pulse generator.

3. In an automatic signal pulse tracking system which includes a range gate pulse generator operative in response to the trailing edge of a variable width pulse to provide a gating pulse for following an incoming signal pulse, and a variable width pulse generator for producing a pulse whose width is proportional to the magnitude of a continuously variable amplitude control voltage, a circuit for generating said control voltage comprising a coincidence circuit means for delivering a first voltage only when said range gate pulse and said signal pulse coincide, means for coupling said signal pulse and said range gate pulse to said coincidence circuit, a condenser, a series connected charging circuit for said condenser including a constant current device and a source of direct current voltage, a gaseous discharge device means having anode and cathode electrodes coupled across said condenser for discharging same when the voltage across said condenser reaches the breakdown potential of said discharge device, a vacuum tube electron discharge device having at least cathode, control, and plate electrodes, the anode and cathode electrodes connected in parallel circuit relation to said condenser and in series circuit relation to said constant current device, biasing means coupled to said vacuum tube device for normally rendering same non-conductive in the absence of said first voltage, said coincident circuit means coupled to said vacuum tube control electrode whereby said condenser begins to discharge upon coincidence of said range gate pulse and said signal pulse, and means connected to said charging circuit for coupling the voltage developed therein to the variable width pulse generator.

4. An automatic signal pulse tracking system for use in a pulse transmitting-receiving system for causing a gating pulse to coincide with and automatically follow received pulses which occur in a given range segment comprising a first gating means for generating gating pulses in isochronism with the trailing edge of a first control voltage, a source of reference pulses having substantially the same pulse repetition rate as the pulses transmitted by said pulse transmitting system, first control voltage generating means coupled between said source of reference pulses and said first gating means for generating a voltage which consists of a pulse whose leading edge is in isochronism with said reference pulses and has a duration proportional to the magnitude of a second control voltage coupled thereto, second control voltage generating means coupled to said first control voltage generating means comprising a charging circuit means, a source of direct current charging voltage in series with said charging circuit, a gaseous discharge device coupled in parallel circuit relation to a portion of said charging circuit so that when the voltage in said portion exceeds the breakdown voltage of said gaseous device said circuit will be suddenly discharged, a second discharging means coupled in parallel circuit relation to a portion of said charging circuit operative to discharge said latter circuit only when a third control voltage is fed thereto, a coincident circuit coupled to the output of said first gating means and to a source of said received pulses for generating said third control voltage only when a receiver pulse and a gating pulse of said first gating means coincide, means coupling the output of said coincident circuit to said second discharging means.

References Cited in the file of this patent
UNITED STATES PATENTS

| | | |
|---|---|---|
| 2,403,527 | Hershberger | July 9, 1946 |
| 2,403,975 | Graham | July 16, 1946 |
| 2,416,088 | Deerhake | Feb. 18, 1947 |
| 2,421,018 | De Rosa | May 27, 1947 |
| 2,422,074 | Bond | June 10, 1947 |
| 2,495,753 | Mozley | Jan. 31, 1950 |
| 2,513,988 | Wolff et al. | July 4, 1950 |
| 2,516,356 | Tull et al. | July 25, 1950 |
| 2,538,027 | Mozeley et al. | Jan. 16, 1951 |
| 2,543,072 | Stearns | Feb. 27, 1951 |